Figure 1:
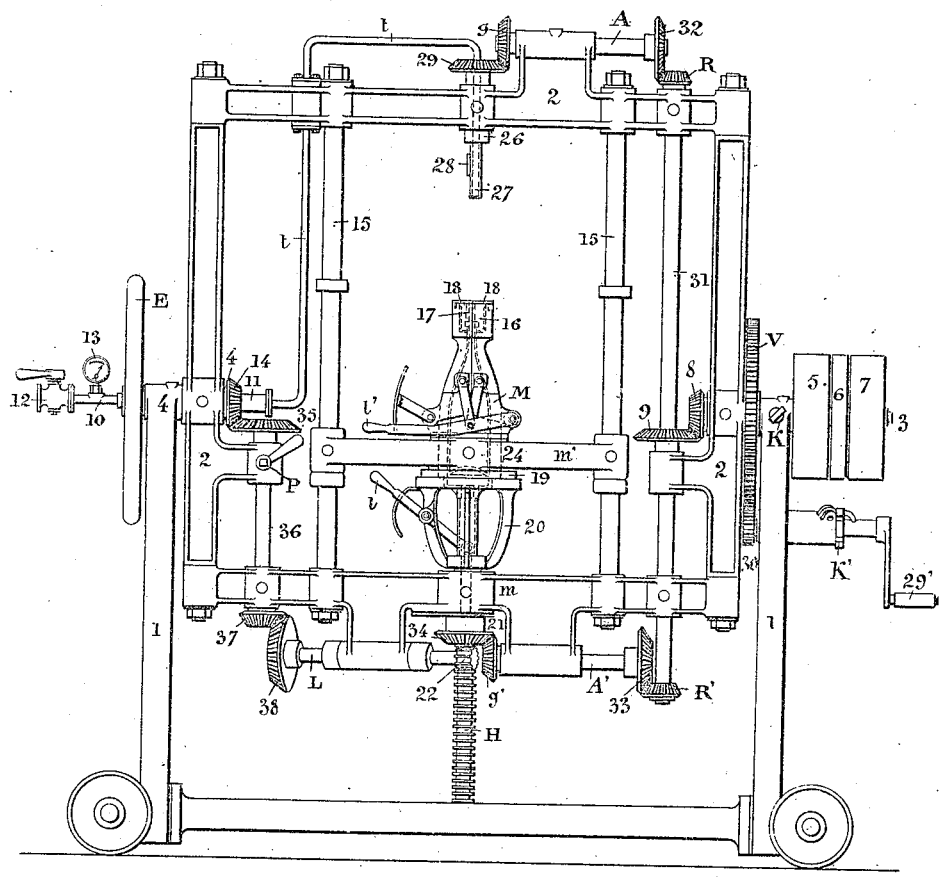

(No Model.)

P. B. MAUSSIER.
MACHINE FOR MANUFACTURING BOTTLES, &c.

No. 546,931. Patented Sept. 24, 1895.

3 Sheets—Sheet 1.

Witnesses

Inventor
Pierre Balthazar Maussier

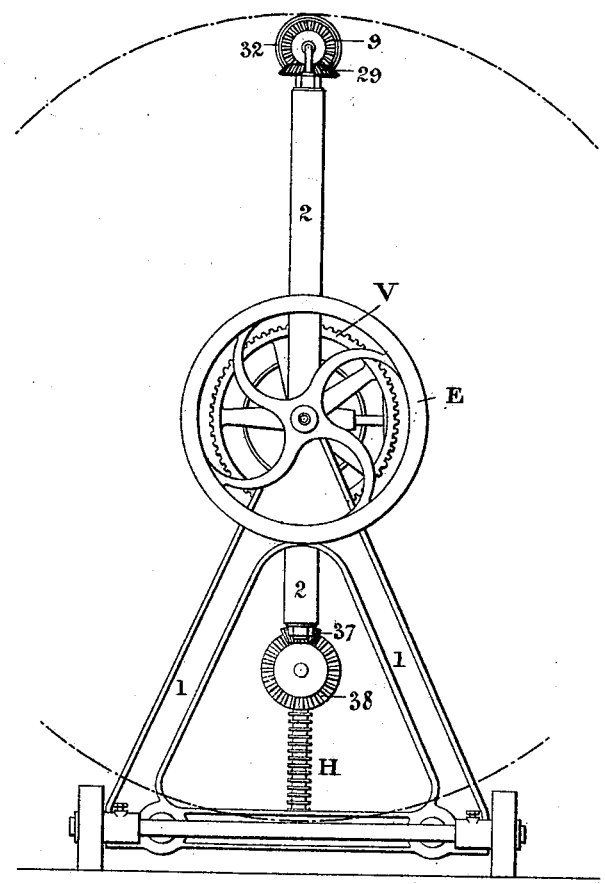

(No Model.) 3 Sheets—Sheet 3.
P. B. MAUSSIER.
MACHINE FOR MANUFACTURING BOTTLES, &c.
No. 546,931. Patented Sept. 24, 1895.
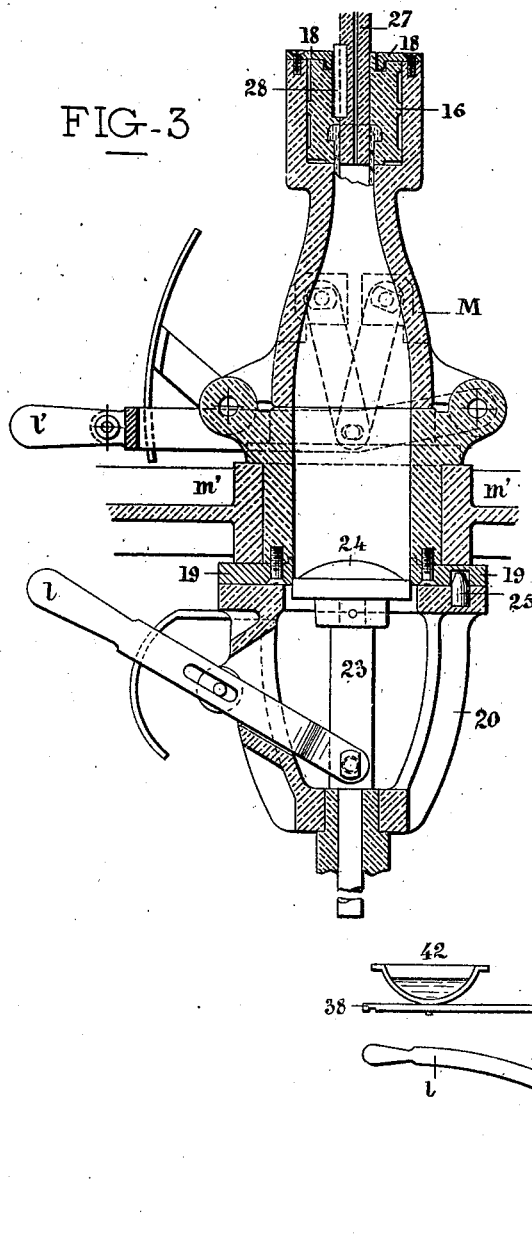
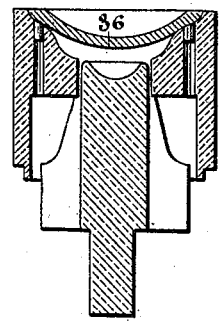
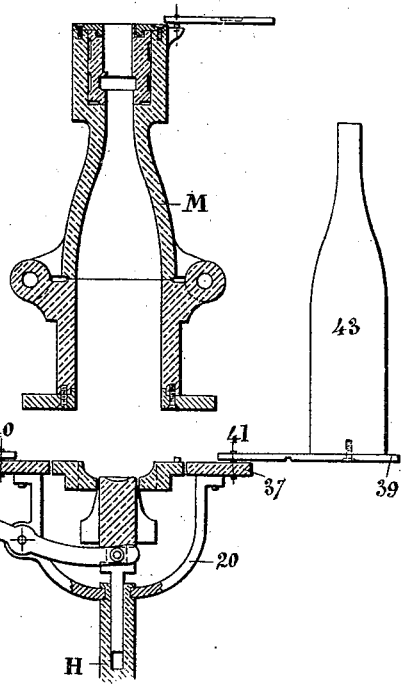
Witnesses
Inventor

UNITED STATES PATENT OFFICE.

PIERRE BALTHAZAR MAUSSIER, OF ST. GALMIER, FRANCE.

MACHINE FOR MANUFACTURING BOTTLES, &c.

SPECIFICATION forming part of Letters Patent No. 546,931, dated September 24, 1895.

Application filed October 9, 1894. Serial No. 525,402. (No model.) Patented in France May 5, 1894, No. 238,152, and May 23, 1894, No. 238,624; in Belgium July 27, 1894, No. 111,154; in Italy August 1, 1894, LXXII, 324, and in Hungary September 3, 1894, No. 1,034.

*To all whom it may concern:*

Be it known that I, PIERRE BALTHAZAR MAUSSIER, gentleman, a citizen of the Republic of France, residing at St. Galmier, (Loire,) in the Republic of France, have invented certain new and useful Improvements in and Relating to Machines for Use in Manufacturing Bottles and other Articles of Glass or the Like, (for which I have obtained patents in France, No. 238,152, dated May 5, 1894, and No. 238,624, dated May 23, 1894; in Belgium, No. 111,154, dated July 27, 1894; in Italy, Vol. LXXII, No. 324, dated August 1, 1894, and in Hungary, No. 1,034, dated September 3, 1894,) of which the following is a specification, reference being had to the accompanying drawings.

This invention relates to machines for use in manufacturing bottles and other articles of glass or the like.

A machine constructed according to the said invention is characterized by the fact that independently of any other appropriate movements the molds and other operative parts assisting in the manufacture of the glass article receive not only a rotary movement upon themselves, but also a rotary movement in a vertical plane about a horizontal axis. This combination of movements, which has not heretofore been used in the construction of a machine for manufacturing bottles, is one of the principal causes of the success of the improved machine. This machine may be used either with hot air or with cold air, or it may be arranged for working either by directly casting glass in the mold or with a glass-blower's pipe after collecting the glass. It may also be arranged for pressing the glass by means of mandrels at will.

In the accompanying drawings, Figure 1 represents a front elevation of my improved machine. Fig. 2 is a side elevation of the same. Fig. 3 is a section of the mold and mold-holder. Fig. 4 shows a detail of a pointed bottom piece. Fig. 5 is a view showing the arrangement of the machine with mandrels.

The machine comprises a carrier-frame 1, which may be fixed or mounted on wheels. In the interior of this frame is a tool-frame 2, carried by two horizontal axes or shafts 3 and 4, upon which it is loose. The axis or shaft 3 is solid and carries on the one hand three pulleys 5 6 7, of which the pulley 6 alone is fixed, and on the other hand a bevel-pinion 8, gearing with another bevel-pinion 9. The toothed wheel V is fixed to the frame 2, being loose upon the shaft 3. The axis or shaft 4 is hollow and is traversed on the one hand by a fixed tube 10 and on the other hand by a tube 11, which rotates with the frame. These two tubes are connected either end to end or by any joint in such a manner as to insure the passage of the air into an air-tube $t$. The tube 10 carries a valve 12, and a gage 13 is designed for indicating the pressure and temperature. Upon the hollow shaft 4 is keyed a fly-wheel E and a bevel-pinion 14. The tool-frame 2 has two round rods or guides 15, upon which a cross-piece $m'$ may slide with little friction, the said cross-piece carrying the mold M.

The mold M is one similar to those employed in glass-works, and may be replaced by any other kind of mold. A hand-lever $l'$ enables the two movable parts or jaws to be opened. At their upper part—that is to say, corresponding to the neck of the bottle—these jaws contain a cylinder or clamp 16, formed of two parts, corresponding each to a jaw of the mold. This clamp presents an interior cavity, cylindrical at the top, with a groove 17 or place for the key, and having at the bottom the form of a bottle-neck. This cylinder or clamp 16, under the action of a key 28 on the barrel 27, may turn freely in the cage formed by the two heads of the jaws without, however, being able to leave the same, owing to the presence of two stop-plates 18, secured upon the said heads of the jaws, and the movement is independent of the movement which the mold M may receive.

The mold M rests with a shoulder upon the cross-piece $m'$, its lower cylindrical part being placed in a cylindrical cavity of this cross-piece. A circular plate 19, secured upon the bottom of the mold, forms with the preceding shoulder a kind of neck, with which the transverse piece engages.

A lantern 20 or mold-holder is supported by a rod H, which, owing to a key, is adapted to slide longitudinally in the interior of a sleeve 21, and can participate in a circular movement communicated to the latter. This rod presents at its lower part the form of a circular rack, which gears with a pinion 22, and has at its upper part a cavity serving to receive a small rod 23, which carries the flat bottom 24. The sleeve 21 turns in a cavity provided in the lower cross-piece of the frame m and carries a pinion 34. A hand-lever l serves to raise or lower the flat bottom 24, which latter may be replaced by a pointed bottom, according to the requirements of the manufacture. A bolt 25 is secured upon the lantern, enters a cavity provided in a plate 19 at the bottom of the mold, and enables the mold to be carried away in the rotary movement of the lantern when these two parts rest one upon the other.

The upper cross-piece of the tool-frame 2 presents an opening in which can turn a hollow sleeve 26, terminating at its lower part in a barrel 27, upon which a key 28 is fixed. A bevel-pinion 29 is secured upon the sleeve and gears with another bevel-pinion 9. The tube t penetrates into the interior of the hollow sleeve 26 by means of any joint in such a manner that the air which it conducts may leave through the extremity of the hollow barrel 27. The air furnished by the cock 12 may thus pass freely through the tube 10, the sleeve or hollow shaft 4, the tube t, the sleeve 26, and barrel 27.

Having thus set forth the various operative parts of the machine, I will now proceed to describe the movements which may be imparted to them and the various devices which cause them to move.

The carrier-frame 1, which may be mounted upon wheels, is brought to the desired position near the glass-furnace. The tool-frame 2 turns about a horizontal axis formed by the two shafts 3 and 4. This movement is given to it by means of a crank 29', pinion 30, and wheel V, either in one direction or in the other. A ratchet K' with a pawl enables the movement of the frame to be stopped and the latter to be fixed in a suitable position. The system of pulleys 5 6 7 is actuated by two belts, one being open and the other crossed, so as to obtain at will the rotation in the two directions. The loose pulleys 5 and 7 are twice as broad as the fixed pulley 6 in order to permit of the stopping position of the machine, in which position each of the belts is upon its respective loose pulley. When the movement takes place in one or the other direction, the pulley 6, which is keyed upon the shaft 3, turns the latter and consequently the pinions 8 and 9 and the shaft 31, upon which this latter pinion is keyed, which causes on the one hand the rotation of the upper bevel-pinions R and 32, shaft A, pinions 9 and 29, and barrel 27, and on the other hand the rotation of the pinions R' and 33, shaft A, pinions g' and 34, and rod H, which rotary movements take place in opposite directions. It has already been stated that the rotary move ment of the rod H causes that of the lantern 20 or mold-holder and that of the mold M when the latter bears upon the said lantern. The two movements which have just been described—that is to say, the rotation of the frame about a horizontal axis, and the turning movement of the parts which it carries in the interior (barrel, mold-holder, and mold)—may take place simultaneously by actuating at the same time the crank 29' and pulley 6. This simultaneity of movements may also be obtained otherwise. It is sufficient to tighten the screw K, which connects the shaft 3 with the carrier-frame 1, when, by acting upon the crank 29', I then rotate the tool-frame 2 and, owing to the rolling movement of the pinion 9 upon the pinion 8, the barrel 27, lantern 20, and mold M are caused to turn. I may impart to these several parts alternating movements by acting upon the crank 29' alternately in one and the other direction. In this simultaneity of movements which I have just described, it is seen that the operative parts, the barrel, mold, and mold-holder, while turning upon themselves about their axes will, owing to the rotation of the frame, be displaced in a vertical plane passing through the said axes. For raising the lantern and mold-holder by causing the cross-piece m' to slide upon the guides 15 it is sufficient to act upon the hand-wheel E which by the pinions 14 and 35, shaft 36, pinions 37 and 38, shaft L, and the pinion 22 will cause the displacement of the rod H. A pressing-screw P enables all these parts and consequently also the lantern 20 to be fixed in a definite position between the guides of the frames.

The following is the mode of operation for making a bottle turned with the said machine and by casting the glass:

First. I raise the lantern or mold-holder 20, until the barrel 27 has passed quite into the neck of the mold M, and tighten the screw P.

Second. I turn the tool-frame through an angle of one hundred and eighty degrees, which brings the mold with the neck downward; then I loosen the screw P.

Third. I raise the lantern until it touches the cross-piece m of the tool-frame, which gives the maximum distance between the mold and the lantern.

Fourth. I pour into the mold the necessary quantity of molten glass, lower the mold-holder upon the mold M, and again tighten the screw P.

Fifth. I proceed with the shaping or rolling. For this purpose I turn the frame immediately through an angle of one hundred and eighty degrees, which puts the mold M with its neck upward, and at the same time, owing to a suitable weight given to the lever, causes the flat bottom 24 to rise into the said mold M until it touches the glass. At this moment I may without turning the tool-frame 2 impart to the mold, mold-holder, and barrel a series of alternating movements by means of the system of pulleys 5, 6, and 7. During this movement the cylinder or clamp 16 is carried away by the key 28 on the barrel 27; but as this clamp 16 holds the neck and collar of the bottle, which have received the rough form, it will therefore also turn the mass of molten glass, which will thus receive an alternating rotary movement in the opposite direction to that imparted to the mold M and flat bottom 24. For facilitating the movement of the glass by the clamp 16, the latter may present in the interior a small cavity, into which a little glass passes, thus forming a stud. I may also blow a little during this operation.

Sixth. When the shaping or rolling has been terminated, I lower the mold and mold-holder a little, so as to cause the barrel 27 to leave the collar of the bottle while leaving the key 28 engaged with the groove of the clamp or cylinder 16 and I tighten the screw P.

Seventh. Finishing operation. I turn and blow. For this purpose I open the air-admission cock 12, turn the barrel, the mold-holder, and the mold, and, if necessary, the frame. These movements may either be alternating, as in the shaping or rolling, or continuous, or else oscillatory for the frame and continuous for the mold, mold-holder, and barrel. It will be understood that I may obtain various combinations of movements, which will depend on the manufacture.

Eighth. I loosen the screw P, lower the lantern and the mold to the bottom, the neck being upward.

Ninth. I open the mold, remove the bottle by the neck, close the mold again, lubricate it, and the machine is ready for recommencing an operation.

I have supposed the bottle with a flat bottom; but I can also make the bottle with an egg-shaped bottom, for which it is sufficient to replace the flat bottom 24 by the pointed bottom piece represented in Fig. 4. Care is exercised before each operation to put in a concave false bottom 36, Fig. 4, which is removed either by hand or otherwise when the shaping or rolling has been effected.

If required, I may work this machine in various manners. Thus, for example, the bottom piece provided with rings or ribs, as shown in Fig. 4, may be used without the false bottom 36 by rotating the said bottom piece while the mold remains fixed or participates in the movement of the barrel.

It has been stated that the same machine may operate with the glass-blower's pipe and previous collection of the glass. For this purpose it is necessary to make some modifications, which will be readily understood. It is needful, in the first place, to lengthen the tool-frame 2, then change the form of the barrel, which is constructed in two parts connected by hinges and forming a jaw, so as to seize the extremity of the glass-blower's pipe, which latter for facilitating the operation may have a square end. The frame is thus provided with an intermediate cross-piece, which serves to hold the glass-blower's pipe. The order of the operations is nearly the same as previously, excepting that the casting of the glass is dispensed with. I open the mold, introduce into it the molten glass suspended from the end of the glass-blower's pipe, and the shaping or rolling of which has been effected previously or with a machine, as hereinbefore set forth, with regard to the fifth operation; then I fix the glass-blower's pipe and close the mold (the mold-holder being pressed against the mold). I turn and blow. When the bottle is completed, I lower the mold-holder a little in order to disengage the glass-blower's pipe. I open the mold, remove the bottle still suspended from the glass-blower's pipe, and whose neck may be finished after reheating with the usual clamp or in any other manner.

The same machine may be arranged for pressing bottles and other articles of glass by means of mandrels. For this purpose the aforesaid rod H carries, together with the lantern 20, an annular plate 37, Fig. 5, upon which are two small rotary plates 38 and 39. The small plate 38 turns about an axis 40 and the plate 39 about an axis 41. Upon these two turning plates are fixed a cup 42 and a mandrel 43. The rod H receives, also, in this case an upward and downward movement as well as a rotary movement while the mold M is fixed. With the machine thus arranged I operate in the following manner: The mold M, having its neck downward and resting upon the barrel, I pour in the molten glass, then turning the plate 30 in such a manner that the mandrel, which has also its neck downward, shall be in the axis of the mold. With the hand-lever l, I bring the upper plate near the pointed bottom piece, whose stud enters a cavity provided in the base of the mandrel. I lower the rod H and introduce the said mandrel 43 into the mold. I turn, which necessitates raising the mandrel a little in order that the clamp 16 may cause the glass to turn, then bringing the mold with its neck upward again I lower the rod H, so as to remove the mandrel. I put in its place the cup 42, into which a little molten glass has previously been poured. I blow hot air through the barrel or exteriorly against the bottom, so as to unite with the remainder of the bottle this quantity of glass, which is to form the bottom. I again lower the rod H, so as to remove the cup 42. I raise the pointed bottom piece or the flat bottom by means of the hand-lever l and complete the bottle by blowing.

It should be observed that for facilitating the union of the glass brought by the cup to the remainder of the bottle, which has been chucked, I may impart some oscillatory movements to the tool-frame at the same time as I turn, so as to equalize and distribute more uniformly this quantity of glass added to the mold.

In these several uses and modifications of my improved machine, the blowing is always effected by means of air supplied at a suitable pressure by a reservoir or from any source. This air is preferably hot, but at a temperature varying according to circumstances, reaching even 400° or more, and may also be mixed with dry or moist steam.

The lubrication on the mold before the operation is effected by supplying it from a special reservoir of air, which may or may not contain steam, with a certain quantity of fatty materials in suspension; but what characterizes this machine in particular is the oscillatory movement of the tool-frame 2, which, while turning the mold upon itself, enables it to be inclined, so as to facilitate the spreading of the still pasty glass upon the interior sides of the mold and to obtain as far as possible an equal distribution of the glass.

I may construct the machine with several molds, so that it can make several bottles at the same time. The modifications necessary in this case are of little importance and easily made.

The tube $t$, instead of conveying air to the the barrel 27, may conduct it into a reservoir which distributes it to each of the barrels. The shafts A A' and L are lengthened and carry as many pinion as there are barrels, such as 27, and rods, such as H, Figs. 1 and 2.

What I claim is—

1. In machines for manufacturing bottles and other articles of glass or vitrifiable material, the combination with a frame supported on two horizontal shafts and adapted to be rotated thereon in a vertical plane, of a vertically movable mold holder supported in said frame and adapted to be rotated on its vertical longitudinal axis, a rotatable clamp located in the mouth of the mold and having the form of a bottle neck to grasp and rotate the same, a rotatable sleeve or barrel supported by a cross-bar of the frame and carrying a key adapted to engage said clamp, means for introducing air into the bottle through said barrel, and mechanism for rotating the said barrel and mold in opposite directions on their longitudinal axes and for simultaneously rotating the said frame in either direction on its horizontal axis, substantially as described.

2. In machines for manufacturing bottles and other articles of glass or vitrifiable material, the combination with the frame 1 having mounted therein a frame 2 adapted to be rotated in a vertical plane, of the vertically movable mold holder 20, 21, mounted in said rotatable frame 2 and adapted to be rotated on its longitudinal axis, the mold M having in its mouth the rotatable clamp 16, the barrel 27 adapted to be rotated on its longitudinal axis and provided with a key 28 to engage in said clamp, gearing for rotating the barrel and mold holder in opposite directions, and mechanism for simultaneously imparting a rotary movement to the frame 2 in a vertical plane, substantially as described.

In witness whereof I have hereunto set my hand this 15th day of September, 1894.

PIERRE BALTHAZAR MAUSSIER.

Witnesses:
  XAVIER JANICOT,
  JEAN GERMAIN.